United States Patent
Sasaki et al.

(10) Patent No.: US 9,800,145 B2
(45) Date of Patent: Oct. 24, 2017

(54) CONTROL DEVICE, DC-DC CONVERTER, SWITCHING POWER SUPPLY APPARATUS, AND INFORMATION PROCESSING APPARATUS

(71) Applicant: FUJITSU LIMITED, Kawasaki-shi, Kanagawa (JP)

(72) Inventors: Tomotake Sasaki, Kawasaki (JP); Yu Yonezawa, Sagamihara (JP); Junji Kaneko, Mishima (JP); Yoshiyasu Nakashima, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 44 days.

(21) Appl. No.: 14/709,585

(22) Filed: May 12, 2015

(65) Prior Publication Data

US 2015/0346788 A1    Dec. 3, 2015

(30) Foreign Application Priority Data

May 30, 2014  (JP) ................ 2014-112444

(51) Int. Cl.
*H02M 3/156*  (2006.01)
*H02M 3/155*  (2006.01)
(Continued)

(52) U.S. Cl.
CPC .......... *H02M 3/156* (2013.01); *H02M 3/155* (2013.01); *G06F 1/263* (2013.01); *G06F 1/28* (2013.01);
(Continued)

(58) Field of Classification Search
CPC .......... G06F 1/263; G06F 1/28; H02M 3/155; H02M 3/156; H02M 2001/0025; H02M 2001/0048; H02M 2001/007
(Continued)

(56) References Cited

U.S. PATENT DOCUMENTS 6,781,351 B2 *  8/2004  Mednik ............... H02M 1/4208
                                                   323/222
8,773,103 B2 *  7/2014  Yonezawa ............. H02M 3/158
                                                   307/31

(Continued)

FOREIGN PATENT DOCUMENTS

| CN | 102801315 A | 11/2012 |
|---|---|---|
| JP | 2008-113542 | 5/2008 |
| JP | 2010-011567 | 1/2010 |

OTHER PUBLICATIONS

Extended European Search Report dated Dec. 4, 2015 for corresponding European Patent Application No. 15167565.9, 6 pages.
(Continued)

*Primary Examiner* — Kyle J Moody
(74) *Attorney, Agent, or Firm* — Fujitsu Patent Center

(57) ABSTRACT

A control device includes a processor that executes a process including generating a driving signal that drives a switching device, so that an output voltage of a converter circuit that performs a step-down conversion on input power by driving the switching device matches a target value, and modifying the target value so that as an output current of the converter circuit becomes lower the output voltage becomes closer to an upper limit value of the output voltage.

15 Claims, 12 Drawing Sheets

(51) Int. Cl.
*G06F 1/26* (2006.01)
*G06F 1/28* (2006.01)
*H02M 1/00* (2006.01)

(52) U.S. Cl.
CPC ............... *H02M 2001/007* (2013.01); *H02M 2001/0025* (2013.01); *H02M 2001/0048* (2013.01); *Y02B 70/1491* (2013.01)

(58) Field of Classification Search
USPC ................................. 323/266, 282, 283, 284
See application file for complete search history.

(56) References Cited

U.S. PATENT DOCUMENTS

2005/0058220 A1* 3/2005 Nagatani .................. H03F 1/32
 375/296
2006/0220629 A1* 10/2006 Saito ..................... H02M 3/157
 323/282
2007/0096703 A1 5/2007 Jain
2008/0252277 A1 10/2008 Sase et al.
2012/0299565 A1 11/2012 Zhang et al.
2012/0299569 A1 11/2012 Zhang et al.
2016/0006347 A1* 1/2016 Matsui .................... H02M 3/04
 323/304

OTHER PUBLICATIONS

Chinese Office Action dated Apr. 27, 2017 for corresponding Chinese Patent Application No. 201510289359.X, with English Translation, 18 pages.

* cited by examiner

CONTROL DEVICE, DC-DC CONVERTER, SWITCHING POWER SUPPLY APPARATUS, AND INFORMATION PROCESSING APPARATUS

CROSS-REFERENCE TO RELATED APPLICATIONS

This application is based upon and claims the benefit of priority of the prior Japanese Patent Application No. 2014-112444, filed on May 30, 2014, the entire contents of which are incorporated herein by reference.

FIELD

The embodiments discussed herein are related to a control device, a DC-DC converter, a switching power supply apparatus, and an information processing apparatus.

BACKGROUND

In a known switching power supply apparatus, such as that proposed in Japanese Laid-Open Patent Publication No. 2008-113542, for example, a target value of an output voltage is fixed to a certain value within a predetermined voltage range, and typically to a center value within the voltage range.

SUMMARY

Accordingly, it is an object in one aspect of the embodiments to provide a control device, a DC-DC converter, a switching power supply apparatus, and an information processing apparatus, which can improve the efficiency of the converter circuit.

According to one aspect of the embodiments, a control device includes a processor that executes a process including generating a driving signal that drives a switching device, so that an output voltage of a converter circuit that performs a step-down conversion on input power by driving the switching device matches a target value; and modifying the target value so that as an output current of the converter circuit becomes lower the output voltage becomes closer to an upper limit value of the output voltage.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

An efficiency of a step-down converter circuit, that converts input power by driving a switching device, improves as a setting of an output voltage of the converter circuit becomes higher. This is because, for the same output power, an output current becomes lower as the output voltage becomes higher, and a loss at the switching device or the like can be reduced.

However, in the proposed switching power supply apparatus described above in which the target value of the output voltage is fixed to the certain value within the predetermined voltage range, and typically to the center value within the voltage range, the output voltage cannot be controlled to a value higher than the certain value. For this reason, there is a margin for improving the efficiency of the converter circuit.

Preferred embodiments of the present invention will be described with reference to the accompanying drawings.

A description will now be given of the control device, the DC-DC converter, the switching power supply apparatus, and the information processing apparatus in each embodiment according to the present invention.

Figure 1:
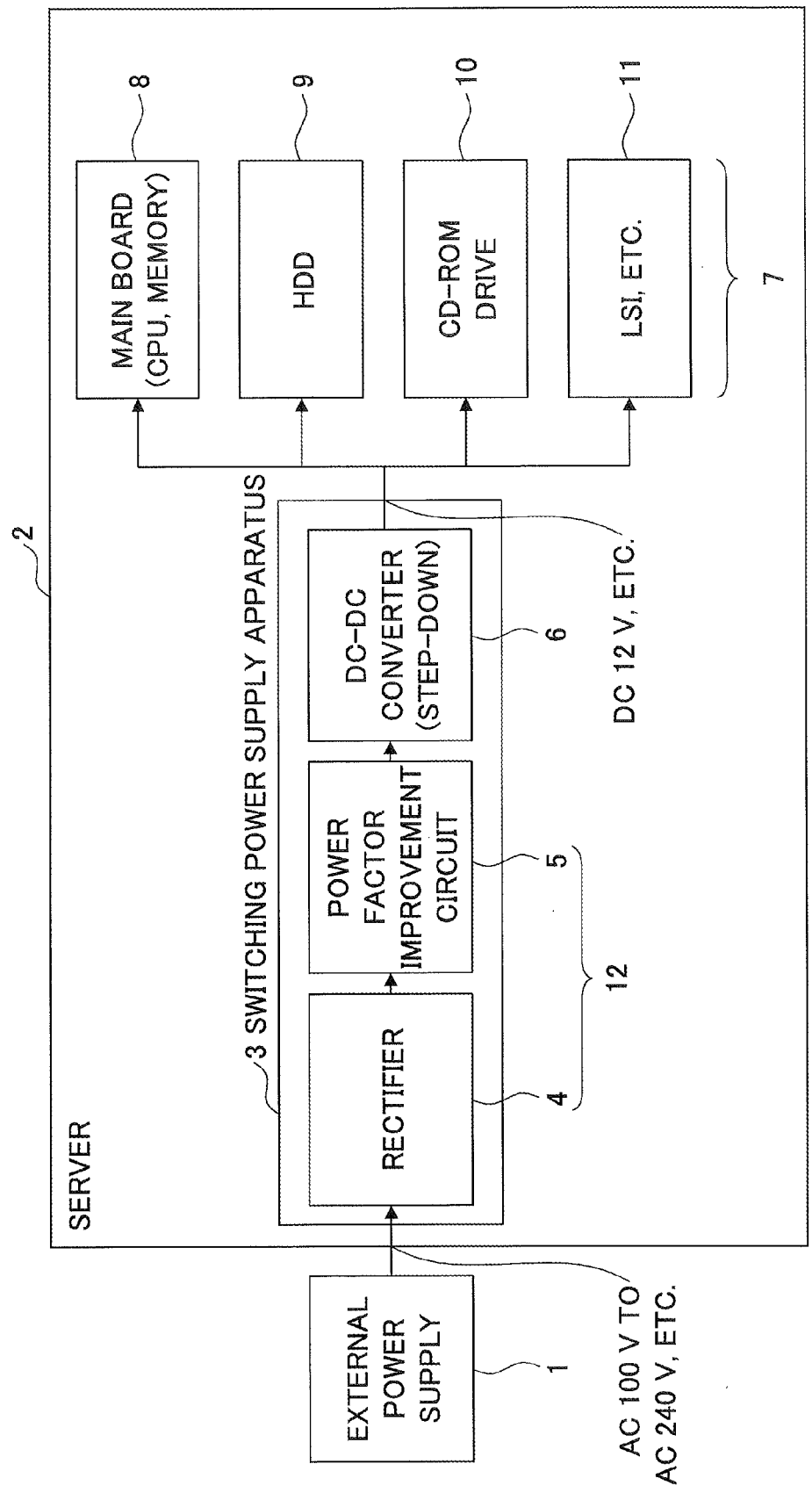
FIG. 1 is a structural diagram illustrating an example of an information processing apparatus.

FIG. 1 is a structural diagram illustrating an example of an information processing apparatus. More particularly, FIG. 1 illustrates a server 2 that is an example of the information processing apparatus configured to process information. The server 2 provides information processing in order to provide services according to request from a client. AC power having a predetermined AC voltage of AC 100 V to AC 240 V, for example, is supplied to the server 2 from an external power supply 1. The server 2 includes a load 7 and a switching power supply apparatus 3.

The load 7 is an example of a load supplied with a DC output voltage of DC 12 V, for example, output from a DC-DC converter 6 of the switching power supply apparatus 3. The load 7 is an electronic device used for the information processing performed by the server 2, for example. The load 7 may be one or more loads. In the example illustrated in FIG. 1, the load 7 includes a main board 8 provided with a CPU (Central Processing Unit) and a memory, an HDD (Hard Disk Drive) 9, a CD-ROM (Compact Disk-Read Only Memory) drive 10, an LSI (Large Scale Integrated circuit) 11, or the like.

The switching power supply apparatus 3 is an example of a switching power supply apparatus that generates the DC output voltage to be supplied to the load 7. For example, the switching power supply apparatus 3 generates the DC output voltage by performing a power conversion on the AC power supplied from the external power supply 1. The switching power supply apparatus 3 includes an AC-DC converter 12, and the DC-DC converter 6.

The AC-DC converter 12 is an example of an AC-DC converter that outputs DC power by converting AC power. For example, the AC-DC converter 12 performs a power conversion on the AC power input from the external power supply 1, and outputs the DC power with respect to the DC-DC converter 6. The AC-DC converter 12 includes a rectifier 4 and a power factor improvement circuit 5, for example.

The rectifier 4 is an example of a rectifier circuit that rectifies the AC power input from the external power supply 1. The power factor improvement circuit 5 is an example of a circuit that improves the power factor or reduces harmonics. An output of the rectifier 4 is input to the power factor improvement circuit 5, and the power factor improvement circuit 5 supplies the DC power to the DC-DC converter 6.

The DC-DC converter 6 is an example of a DC-DC converter that outputs the DC power after stepping down the DC power. For example, the DC-DC converter 6 performs a step-down conversion on the DC power input from the AC-DC converter 12, and outputs the DC power after the step-down conversion with respect to the load 7. The output voltage after the step-down conversion, output from the DC-DC converter (hereinafter also referred to as "an output voltage of the DC-DC converter 6"), is applied to the load 7. An output current after the step-down conversion, output from the DC-DC converter 6 (hereinafter also referred to as "an output current of the DC-DC converter 6"), flows through the load 7. The current flowing through the load 7 is hereinafter also referred to as "a load current I".

Figure 2:
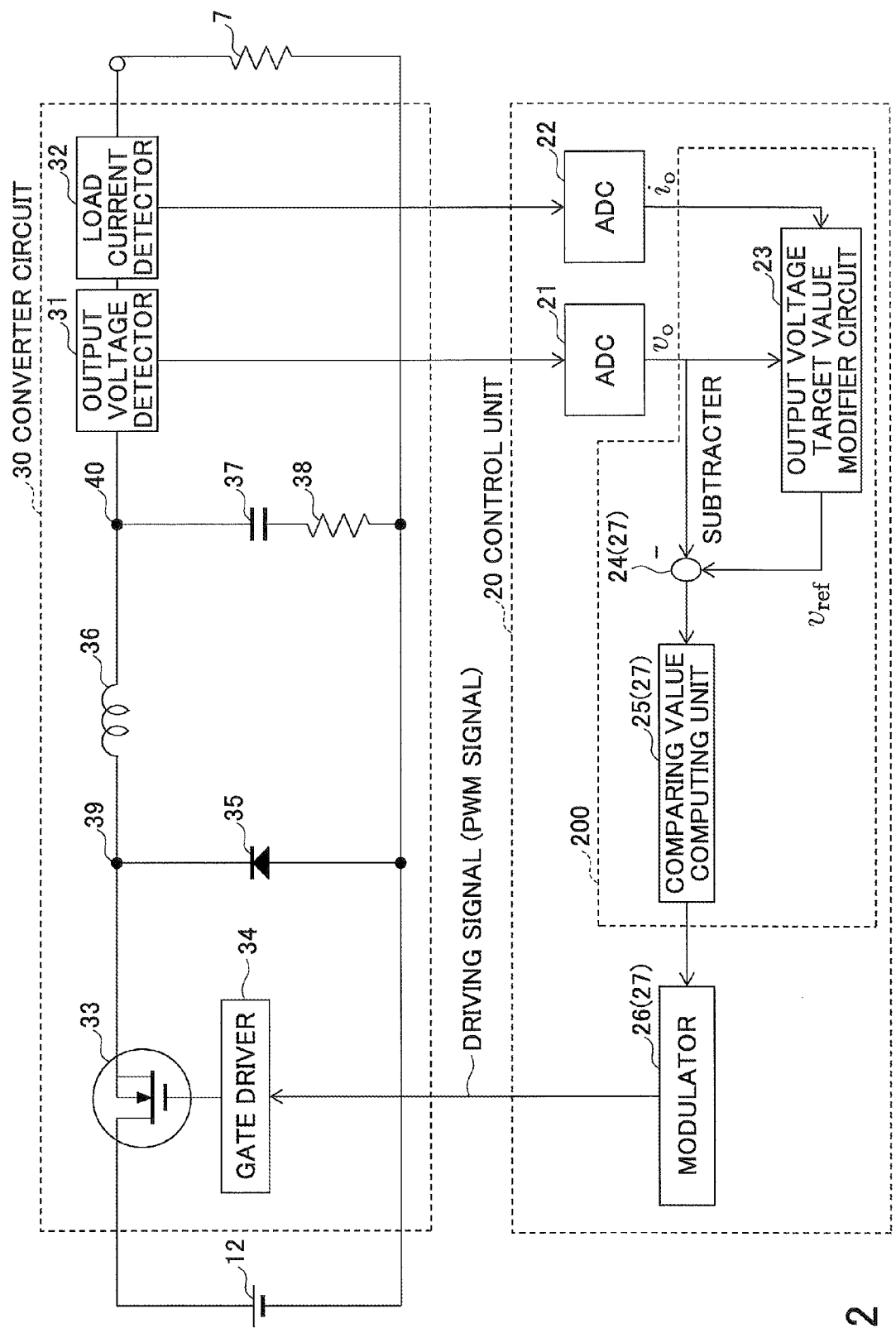
FIG. 2 is a structural diagram illustrating an example of a DC-DC converter.

FIG. 2 is a structural diagram illustrating an example of the DC-DC converter 6. The DC-DC converter 6 illustrated in FIG. 2 includes a converter circuit 30 and a control unit 20.

The converter circuit 30 is an example of a converter circuit that performs a step-down conversion on the DC input power input from the AC-DC converter 12, and outputs the DC power after the step-down conversion with respect to the load 7. For example, the converter circuit 30 is a back converter including a transistor 33, a gate driver 34, a choke coil 36, a diode 35, an output capacitor 37, a voltage detector 31, and a load current detector (hereinafter simply referred to as "current detector") 32.

The transistor 33 is an example of a switching device to which the input power from the AC-DC converter 12 is input. For example, the transistor 33 is a semiconductor switch, such as a MOSFET (Metal Oxide Semiconductor Field Effect Transistor), a bipolar transistor, or the like. FIG. 2 illustrates an example in which the transistor 33 is an N-channel MOSFET.

The gate driver 34 is an example of a circuit that drives the transistor 33, that is, turns the transistor 33 ON or OFF, according to a driving signal (hereinafter also referred to as "a driving signal $S_g$") supplied from the control unit 20. For example, the driving signal $S_g$ is a PWM (Pulse Width Modulated) signal having a duty cycle that varies.

The choke coil 36 is an example of an inductor through which the current flows according to the transistor 33 that is driven and turned ON or OFF. The choke coil 36 includes an input end that is connected to an output electrode (source electrode in the example illustrated in FIG. 2) of the transistor 33 via a node 39, and an output end that is connected to one end of the output capacitor 37 via a node 40.

The diode 35 is an example of a rectifying device that causes a return current to flow through the choke coil 36 when the transistor 33 is turned OFF. The diode 35 includes an anode that is connected to ground, and a cathode that is connected to the output electrode of the transistor 33 and the input end of the choke coil 36 via the node 39. The diode 35 may be replaced by a switching device for synchronous rectification.

The output capacitor 37 is an example of a capacitor that smoothens the output voltage output from the output end of the choke coil 36 (that is, an output voltage V of the converter circuit 30), according to the transistor 33 that is turned ON or OFF by the PWM control. The output capacitor 37 includes the one end connected to the output end of the choke coil 36, and another end connected to ground. A stray resistance 38 is an equivalent series resistance of the output capacitor 37.

The voltage detector 31 is an example of a voltage detection circuit or means that detects the output voltage V of the converter circuit 30 (that is, the output voltage of the DC-DC converter 6), and outputs a detection voltage according to a voltage value of the output voltage V. An example of the voltage detector 31 includes a resistance voltage divider circuit that outputs a divided voltage by dividing the output voltage V by voltage-dividing resistors, or the like.

The current detector 32 is an example of a current detection circuit or means that detects the load current I flowing through the load 7 from the output end of the choke coil 36 (that is, the output current of the converter circuit 30), and outputs a detection voltage according to a current value of the load current I. An example of the current detector 32 includes a resistor that is connected in series between the output end of the choke coil 36 and the load 7, or the like.

The control unit 20 is an example of a control unit that controls a step-down operation of the converter circuit 30, so that the output voltage V of the converter circuit 30 matches the target value. For example, the control unit 20 includes ADCs (Analog-to-Digital Converters) 21 and 22, a drive controller 27, and a target value modifier 23. Software and a microcomputer 200 may cooperate to execute processes for performing operations of the ADCs 21 and 22, the drive controller 27, and the target value modifier 23. The microcomputer 200 is an example of a processor, and may include the target value modifier 23 and the drive controller 27, as indicated by dotted lines in FIG. 2.

The ADC 21 is an example of a converter circuit or means that converts an analog detection voltage output from the voltage detector 31 into a digital output voltage value $v_o$ and outputs the digital output voltage value $v_o$ with respect to the drive controller 27 and the target value modifier 23. The digital output voltage value $v_o$ corresponds to an equivalent of the voltage value of the output voltage V of the converter circuit 30. The ADC 22 is an example of a converter circuit or means that converts an analog detection voltage output from the current detector 32 into a digital load current value $i_o$, and outputs the digital load current value $i_o$ with respect to the target value modifier 23. The digital load current value $i_o$ corresponds to an equivalent of the current value of the load current I.

Each of the ADCs 21 and 22 may be provided with an anti-aliasing filter. In addition, in a case in which the drive controller 27 and the target value modifier 23 are analog circuits, an acquiring circuit or means other than the ADCs 21 and 22 may acquire the detection voltages from the voltage detector 31 and the current detector 32.

The drive controller 27 is an example of a generator that generates the driving signal $S_g$ that drives the transistor 33, so that the output voltage V of the converter circuit 30 that performs the step-down conversion on the input power by driving the transistor 33 matches the target value. For example, the drive controller 27 preferably generates the driving signal $S_g$ for driving the transistor 33, so that the output voltage value $v_o$ matches an output voltage target value $v_{ref}$. The output voltage target value $v_{ref}$ may be set by the target value modifier 23.

In addition, the drive controller 27 generates the driving signal $S_g$ for driving the transistor 33, so that the output voltage V falls within a reference voltage range, even when a sudden decrease or a sudden increase occurs in the load current I by a predetermined amount that is represented by a maximum variation $\Delta I_{max}$, for example. The drive controller 27 generates the driving signal $S_g$ for driving the transistor 33, so that the output voltage V falls within the reference voltage range that is a lower limit value $V_{min}$ or higher and an upper limit value $V_{max}$ or lower, even when the load current suddenly decreases or suddenly increases by the maximum variation $\Delta I_{max}$, for example.

For example, the sudden decrease of the load current I occurs at a timing when a computation of the server 2 ends, and the sudden increase of the load current I occurs at a timing when the computation of the server 2 starts.

The drive controller 27 includes a subtracter 24, a comparing value computing unit 25, and a modulator 26, for example.

The subtracter 24 is an example of a circuit or means that computes an error $v_{ref}-v_o$ by subtracting the output voltage value $v_o$ from the output voltage target value $v_{ref}$. The comparing value computing unit 25 is an example of a circuit or means that computes a comparing value to be input to the modulator 26, based on the error computed by the subtracter 24. For example, the comparing value computing unit 25 computes the comparing value according to the error $v_{ref}-v_o$ by performing a PI (Proportional-Integral) control. The modulator 26 is an example of a circuit or means that generates the PWM driving signal $S_g$ that drives and turns ON or OFF the transistor 33, based on a carrier signal and the comparing value computed by the comparing value computing unit 25.

The target value modifier 23 is an example of a modifier or means that modifies the target value of the output voltage V, so that the lower the load current I becomes, the closer the output voltage V becomes to the upper limit value $V_{max}$ of the output voltage V due to the driving signal $S_g$ generated by the drive controller 27. For example, the target value modifier 23 preferably modifies the output voltage target value $v_{ref}$, so that the lower the load current value $i_o$ becomes, the closer the output voltage V becomes to the upper limit value $V_{max}$ due to the driving signal $S_g$.

Figure 3:
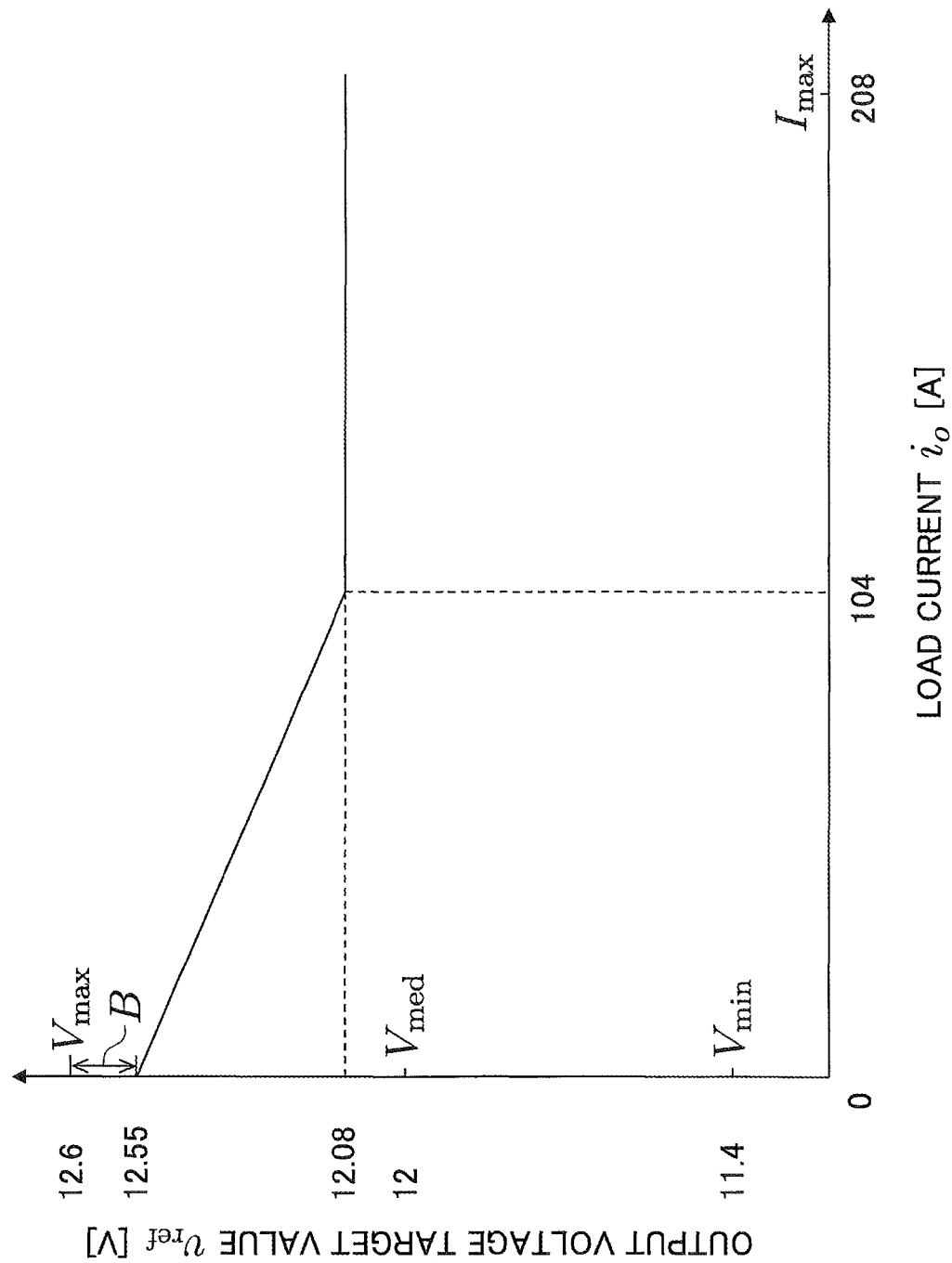
FIG. 3 is a diagram illustrating an example of a relationship between a load current value and an output voltage target value.

FIG. 3 is a diagram illustrating an example of a relationship between the load current $i_o$ and the output voltage target value $v_{ref}$. For the sake of convenience, each of the output voltage target value $v_{ref}$ and the load current value $i_o$ is represented in FIG. 3 by an analog value that is obtained by a digital-to-analog conversion. The target value modifier 23 sets the output voltage target value $v_{ref}$ within a predetermined reference voltage range X. For example, the reference voltage range X is a range between the upper limit value $V_{max}$ and the lower limit value $V_{min}$, and a center value $V_{med}$ is a voltage value at a center between the upper limit value $V_{max}$ and the lower limit value $V_{min}$. Because the target value modifier 23 sets the output voltage target value $v_{ref}$ within the reference voltage range X, the drive controller 27 can control the output voltage V of the converter circuit 30 so that the output voltage V of the converter circuit 30 does not fall outside the reference voltage range X.

In addition, the efficiency of the converter circuit 30 can be represented by a ratio "[output power]/[input power]", namely, the ratio of the output power output from the converter circuit 30 with respect to the input power input to the converter circuit 30. The efficiency of the step-down converter circuit 30, that converts input power by driving the transistor 33, improves as the output voltage of the converter circuit 30 becomes higher. This is because, for the same output power, the output current becomes lower as the output voltage becomes higher, and the loss at the transistor 33 or the like can be reduced.

Accordingly, as illustrated in FIG. 3, the target value modifier 23 modifies the output voltage target value $v_{ref}$, so that the lower the load current value $i_o$, the closer the output voltage V of the converter circuit 30 becomes to the upper limit value $V_{max}$ due to the driving signal $S_g$ generated by the drive controller 27. Hence, the output voltage V of the converter circuit 30 can be controlled to a value that is as high as possible but is within the range that does not exceed the upper limit value $V_{max}$, and for this reason, it is possible to improve the efficiency of the converter circuit 30. For example, the target value modifier 23 may increase to a voltage value higher than the center value $V_{med}$, so that the output voltage target value $v_{ref}$ becomes closer to the upper limit value $V_{max}$ as the load current value $i_o$ becomes lower.

By making the output voltage target value $v_{ref}$ become close to the upper limit value $V_{max}$, the output voltage V becomes close to the upper limit value $V_{max}$, and thus, the efficiency of the converter circuit 30 can be improved. In addition, by making the output voltage target value $v_{ref}$ become the voltage value higher than the center value $V_{med}$, the output voltage V also becomes a voltage value higher than the center value $V_{med}$, and hence, the efficiency of the converter circuit 30 can be improved.

Figure 4:
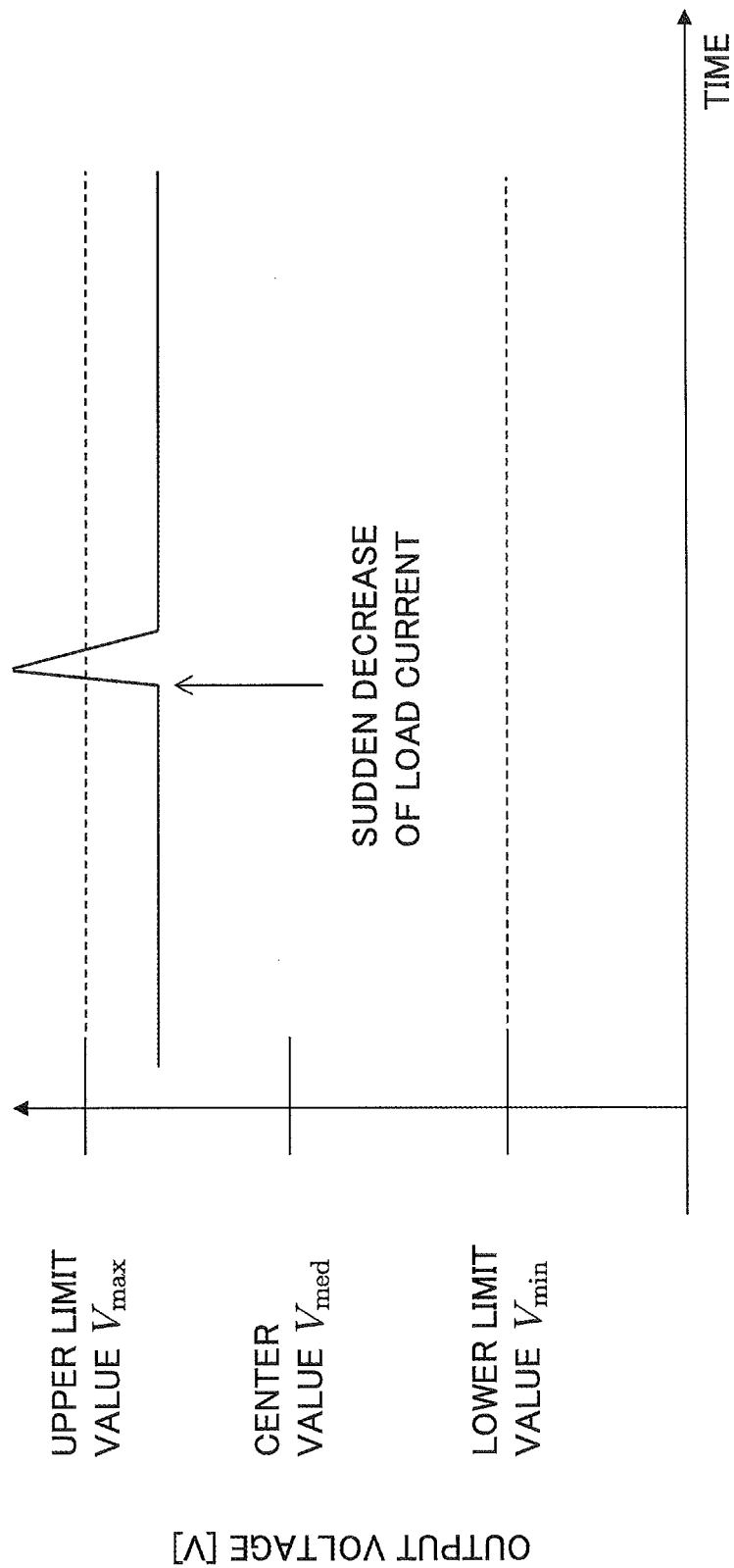
FIG. 4 is a diagram illustrating an example of a behavior of the output voltage at a time of a sudden change in the load current.

Moreover, the output voltage V of the converter circuit 30 temporarily becomes high when the load current I suddenly decreases. For this reason, as illustrated in FIG. 4, when the output voltage target value $v_{ref}$ is set to a value that is too high and the output voltage V of the converter circuit 30 becomes too high, there is a possibility that the output voltage V will exceed the upper limit value $V_{max}$ when the load current I suddenly decreases. FIG. 4 is a diagram illustrating an example of a behavior of the output voltage at a time of a sudden change in the load current.

Accordingly, the target value modifier 23 may modify the output voltage target value $v_{ref}$ so that the output voltage V of the converter circuit 30 will not exceed the upper limit value $V_{max}$ when the load current value $i_o$ decreases at a rate greater than or equal to a predetermined decrease rate. As illustrated in FIG. 3, the target value modifier 23 can suppress the output voltage V of the converter circuit 30 from exceeding the upper limit value $V_{max}$ when the load current I suddenly decreases, also by modifying the output voltage target value $v_{ref}$ so that the output voltage V of the converter circuit 30 becomes closer to the upper limit value $V_{max}$ as the load current value $i_o$ becomes lower. In other words, it is possible to simultaneously improve the efficiency of the converter circuit 30 by making the output voltage V of the converter circuit 30 closer to the upper limit value $V_{max}$, and control the output voltage V of the converter circuit 30 to the upper limit value Vmax or lower when the load current I suddenly decreases.

For example, the target value modifier 23 may increase the output voltage target value $v_{ref}$ to become closer to the upper limit value $V_{max}$ as the load current value $i_o$ becomes lower, so that the output voltage V does not exceed the upper limit value $V_{max}$ when the load current value $i_o$ decreases at the rate greater than or equal to the predetermined decrease rate. Hence, even when the output voltage V of the converter circuit 30 is made closer to the upper limit value $V_{max}$, it is possible to suppress the output voltage V from exceeding the upper limit value $V_{max}$ when the load current I suddenly decreases.

In addition, the target value modifier 23 may modify the output voltage target value $v_{ref}$, so that the a difference obtained by subtracting the output voltage V of the converter circuit 30 from the upper limit value $V_{max}$ becomes a predetermined voltage difference or greater. As a result, even when the output voltage V of the converter circuit 30 is made closer to the upper limit value $V_{max}$, it is possible to suppress the output voltage V from exceeding the upper limit value $V_{max}$ when the load current I suddenly decreases. For example, in the case illustrated in FIG. 3, the target value modifier 23 modifies the output voltage target value $v_{ref}$ according to the load current value $i_o$, so that the difference obtained by subtracting the output voltage V from the upper limit value $V_{max}$ becomes a voltage difference B or greater, where the voltage difference B is a positive constant smaller than $V_{max}-V_{med}$.

Furthermore, because the load current I is a non-negative DC current, a maximum value of a variation ΔI that occurs when the load current I suddenly changes, differs depending on an origin current value at the time when the load current I suddenly changes. For example, in a case in which the maximum variation $ΔI_{max}$ at the time when the load current I suddenly changes is determined in advance according to specifications of the DC-DC converter 6 or the load 7, the maximum value of the variation ΔI at the time when the load current I suddenly changes is the origin current value, as long as the origin current value at the time when the load current I suddenly changes is smaller than the maximum variation $ΔI_{max}$. On the other hand, when the origin current value at the time when the load current I suddenly changes is greater than the maximum variation $ΔI_{max}$, the maximum value of the variation ΔI at the time when the load current I suddenly changes is the maximum variation $ΔI_{max}$ regardless of the magnitude of the origin current value.

A variation ΔV of the output voltage V when the load current I suddenly changes becomes greater as the variation ΔI that occurs when the load current I suddenly changes becomes greater. Accordingly, in a case in which the load current I is higher than the maximum variation $ΔI_{max}$, the variation ΔV of the output voltage V when the load current I suddenly changes is also limited to a certain upper limit value, regardless of the magnitude of the load current I.

Hence, the target value modifier 23 may set the output voltage target value $v_{ref}$ so that the output voltage V does not become closer to the upper limit value $V_{max}$ due to the driving signal $S_g$ as the load current I becomes lower, when the load current I exceeds a predetermined current threshold value $I_{th}$, for example. When the load current value io exceeds the current threshold value $I_{th}$, the target value modifier 23 may fix the output voltage target value $v_{ref}$ to a predetermined value, as illustrated in FIG. 3, for example. This predetermined value is greater than the center value $V_{med}$, for example. The current threshold value $I_{th}$ is set to the maximum variation $ΔI_{max}$, for example.

The target value modifier 23 does not necessarily have to modify the output voltage target value $v_{ref}$ during an interval in which the load current I or the output voltage V changes at a rate greater than or equal to a predetermined change rate. In this case, it is possible to reduce the effects of modifying the output voltage target value $v_{ref}$ on the accuracy with which the output voltage V is controlled.

For example, the target value modifier 23 judges whether the output voltage target value $v_{ref}$ is to be modified, based on an absolute value of a difference between a past detection value and a current detection value of the load current I. Similarly, the target value modifier 23 judges whether the output voltage target value $v_{ref}$ is to be modified, based on an absolute value of a difference between a past detection value and a current detection value of the output voltage V. The target value modifier 23 modifies the output voltage target value $v_{ref}$ in a case in which the absolute value of the difference is less than a predetermined threshold value for at least one of the load current I and the output voltage V. On the other hand, the target value modifier 23 does not modify the output voltage target value $v_{ref}$ and continues to use the past output voltage target value $v_{ref}$ in a case in which the absolute value of the difference is greater than or equal to the predetermined threshold value for at least one of the load current I and the output voltage V.

In addition, the target value modifier 23 may modify the output voltage target value $v_{ref}$ to a voltage value that is determined based on an estimated variation of the output voltage V at the time when the load current I suddenly decreases. In this case in which the output voltage target value $v_{ref}$ is modified based on such an estimated variation, the drive controller 27 can accurately control the output voltage target value $v_{ref}$ so that the output voltage V becomes closer to the upper limit value $V_{max}$, even when the load current I suddenly changes, and the efficiency of the converter circuit 30 can be improved.

The target value modifier 23 may estimate the variation ΔV of the output voltage V at the time when the load current I suddenly decreases, according to the following formula (1), for example, where ΔI denotes a variation [A] of the load current I that changes in steps, C denotes a capacitance [F] of the output capacitor 37, $r_C$ denotes a resistance value [Ω] of the stray resistance 38 of the output capacitor 37, $f_c$ denotes a gain crossover frequency [Hz], and ø denotes a phase margin [rad]. A simplified formula that replaces "√(2−2 cos ø)" by "1" may also be used, as proposed in C. Basso, "Designing Control Loops for Linear and Switching Power Supplies: A Tutorial Guide, Artech House, 2012, for example.

$$ΔV=\{ΔI/\sqrt{(2-2 \cos ø)}\}\sqrt{\{(1/2\pi f_c C)^2 + r_C^2\}} \quad (1)$$

The formula (1) represents a relationship of the variation ΔI of the load current I when the load current I changes in steps, and the variation ΔV of the output voltage V of the DC-DC converter 30, in the DC-DC converter 30 that performs the step-down conversion. In a feedback structure illustrated in FIG. 2, the capacitance C of the output capacitor 37, the resistance value $r_C$ of the stray resistance 38, the gain crossover frequency $f_c$, and the phase margin ø are known. Values of the gain crossover frequency $f_c$ and the phase margin ø may be measured by a gain phase analyzer, for example.

The time when the load current I most suddenly changes is the time when the load current I changes in steps. Hence, by estimating the variation ΔV according to the formula (1), it is possible to prevent the output voltage V from exceeding the upper limit value $V_{max}$ even when the load current I undergoes other sudden decreases.

As described above, the load current I is the non-negative DC current. For this reason, the maximum value of the variation ΔI that occurs when the load current I suddenly changes, differs depending on the origin current value at the time when the load current I suddenly changes. For example, in a case in which the upper limit value $I_{max}$ of the load current I is 208 A and the maximum variation $\Delta I_{max}$ of the load current I is 104 A, the variation $\Delta I$ becomes 104 A (=208−104 A) at the maximum when the load current I suddenly decreases from the origin of 208 A. On the other hand, the variation $\Delta I$ is 50 A at the maximum when the load current I suddenly decreases from the origin of 50 A. Accordingly, the target value modifier 23 may modify the method of estimating the variation $\Delta V$ at the time when the load current I suddenly decreases, according to the magnitude of the current value at the origin when the load current I suddenly decreases.

For example, in the case in which the load current I is the maximum variation $\Delta I_{max}$ or higher (that is, $I >= \Delta I_{max}$), the target value modifier 23 sets the output voltage target value $v_{ref}$ to a value computed according to the following formula (2). In the formula (2), the term "$\{\Delta I_{max}/\sqrt{(2-2\cos\varnothing)}\}\sqrt{\{(1/2\pi f_c C)^2 + r_C^2\}}$" represents the estimate of the output voltage variations when the load current I suddenly decreases.

$$[V_{max} - \{\Delta I_{max}/\sqrt{(2-2\cos\varnothing)}\}\sqrt{\{(1/2\pi f_c C)^2 + r_C^2\}} - B] \quad (2)$$

On the other hand, in the case in which the load current I is lower than the maximum variation $\Delta I_{max}$ (that is, $I < \Delta I_{max}$), the target value modifier 23 sets the output voltage target value $v_{ref}$ to a value computed according to the following formula (3). In the formula (3), the term "$\{I/\sqrt{(2-2\cos\varnothing)}\}\sqrt{\{(1/2\pi f_c C)^2 + r_C^2\}}$" represents the estimate of the output voltage variations when the load current I suddenly decreases. The value computed from the formula (3) is high compared to that computed from the formula (2).

$$[V_{max} - \{I/\sqrt{(2-2\cos\varnothing)}\}\sqrt{\{(1/2\pi f_c C)^2 + r_C^2\}} - B] \quad (3)$$

The formulas (2) and (3) include the margin B, because the actual variation $\Delta V$ of the output voltage V does not necessarily match the estimated value exactly. FIG. 3 illustrates a case in which $V_{min}$=11.4 V, $V_{med}$=12 V, $V_{max}$=12.6 V, $\Delta I_{max}$=104 A, $I_{max}$=208 A, C=10800 μF, $r_C$=1.8 mΩ, $f_c$=5 kHz, $\varnothing$=45°, and B=50 mV.

Figure 5:
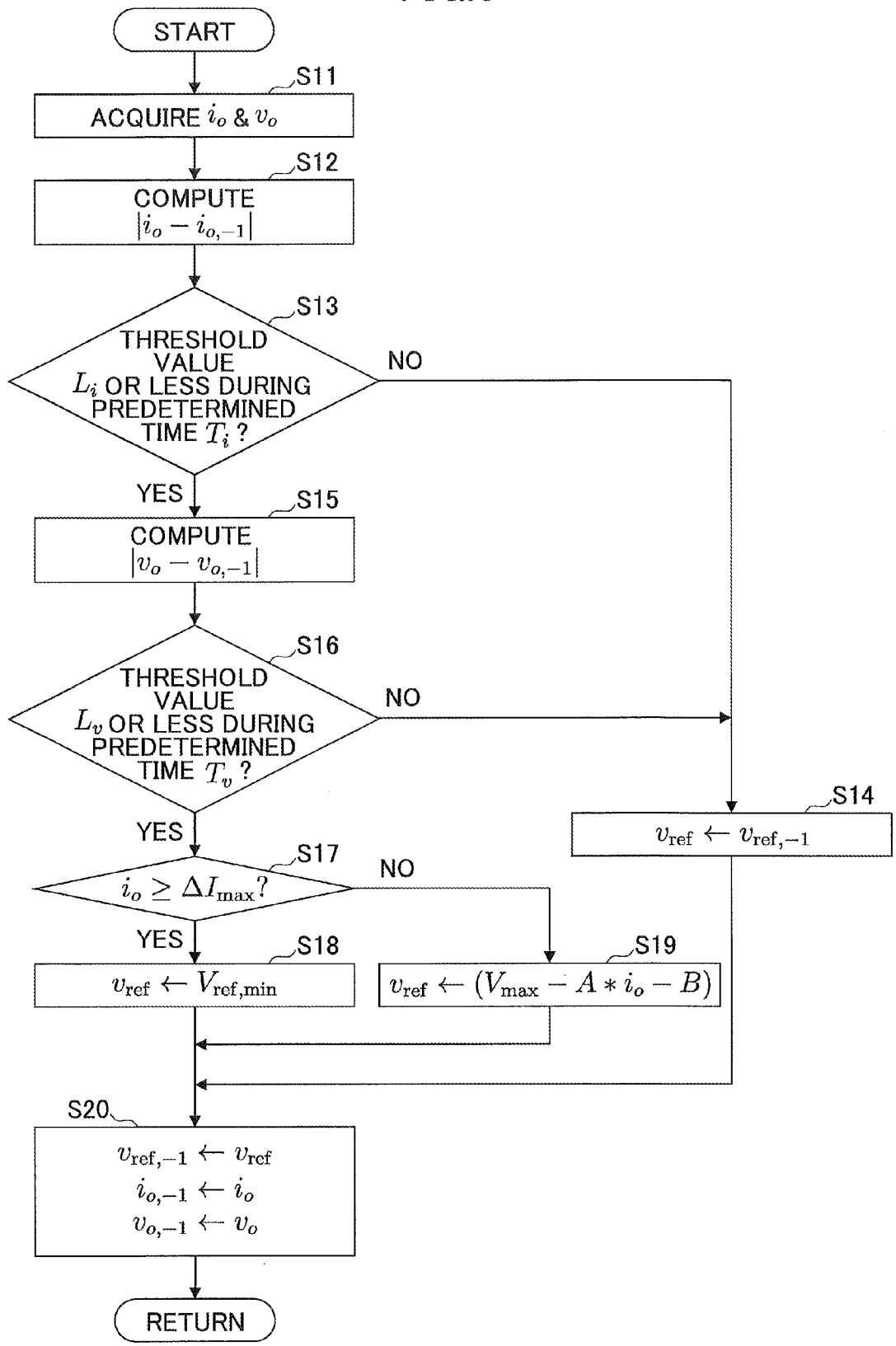
FIG. 5 is a flow chart illustrating an example of a method of setting the output voltage target value.

FIG. 5 is a flow chart illustrating an example of a method of setting the output voltage target value $v_{ref}$ in a case in which $\Delta I_{max} < I_{max}$. Constants and variables are as follows.
$L_i$, $T_i$: Values (current value and time (number of cycles)) used to judge whether the load current is suddenly changing;
$L_v$, $T_v$: Values (current value and time (number of cycles)) used to judge whether the load voltage is suddenly changing;
$\Delta I_{max}$: Maximum value of the variation of the load current at the time when the load current suddenly changes;
$V_{max}$: Maximum value determined with respect to the output voltage;
A: $=\{1/\sqrt{(2-2\cos\varnothing)}\}\sqrt{\{(1/2\pi f_c C)^2 + r_C^2\}}$
B: Margin;
$V_{ref,min}$: $=[V_{max} - \{\Delta I_{max}/\sqrt{(2-2\cos\varnothing)}\}\sqrt{\{(1/2\pi f_c C)^2 + r_C^2\}}] - B$
$v_{ref,-1}$: Output voltage target value of 1 cycle before;
$i_{o,-1}$: Load current of 1 cycle before; and
$v_{o,-1}$: Output voltage of 1 cycle before.

In step S11 illustrated in FIG. 5, the target value modifier 23 acquires the current load current value $i_o$ and the current output voltage value $v_o$.

In step S12, the target value modifier 23 computes the absolute value of the difference between the current value and the previous value of the current load current value $i_o$. In step S13, the target value modifier 23 judges whether the absolute value computed based on the values acquired in a predetermined time $T_i$ is a threshold value $L_i$ or less.

In a case in which the absolute value is greater than the threshold value $L_i$ and the judgment result in step S13 is No, the target value modifier 23, in step S14, sets the current value of the output voltage target value $v_{ref}$ to the previous value and updates the previous value by the current value, in order to prevent the output voltage target value $v_{ref}$ from being modified while the load current value $i_o$ suddenly changes. In other words, the target value modifier 23 sets the output voltage target value $v_{ref}$ to a value identical to the previous value at the previous time. On the other hand, in a case in which the absolute value is the threshold value $L_i$ or less and the judgment result in step S13 is Yes, the target value modifier 23 judges that the load current value $i_o$ is not undergoing a sudden change.

In step S15, the target value modifier 23 computes the absolute value of the difference between the current value and the previous value of the output voltage value $v_o$. In step S16, the target value modifier 23 judges whether the absolute value computed based on the values acquired in a predetermined time $T_v$ is a threshold value $L_v$ or less.

In a case in which the absolute value is greater than the threshold value $L_v$ and the judgment result in step S16 is No, the target value modifier 23, in step S14, sets the current value of the output voltage target value $v_{ref}$ to the previous value and updates the previous value by the current value, in order to prevent the output voltage target value $v_{ref}$ from being modified while the output voltage value $v_o$ suddenly changes. In other words, the target value modifier 23 sets the output voltage target value $v_{ref}$ to a value identical to the previous value at the previous time. On the other hand, in a case in which the absolute value is the threshold value $L_v$ or less and the judgment result in step S16 is Yes, the target value modifier 23 judges that the output voltage value $v_o$ is not undergoing a sudden change.

The target value modifier 23 performs a process of step S17 in a case in which the absolute value computed in step S12 is the threshold value $L_i$ or less and the absolute value computed in step S15 is the threshold value $L_v$ or less.

In step S17, the target value modifier 23 judges whether the load current value $i_o$ is greater than or equal to the maximum variation $\Delta I_{max}$.

In a case in which the load current value $i_o$ is the maximum variation $\Delta I_{max}$ or greater and the judgment result in step S17 is Yes, the target value modifier 23, in step S18, modifies the output voltage target value vref to the value $V_{ref,min}$ that is computed in advance according to the formula (2). On the other hand, in a case in which the load current value $i_o$ is less than the maximum variation $\Delta I_{max}$ and the judgment result in step S17 is No, the target value modifier 23, in step S19, modifies the output voltage target value vref to the value $V_{max} - A^* i_o - B$ the value that is computed according to the formula (3). A computing time required to compute the output voltage target value $v_{ref}$ can be reduced when the constant A is computed in advance according to the formula (3).

In step S20, the target value modifier 23 rewrites the current values of the output voltage target value $v_{ref}$, the load current value $i_o$, and the output voltage value $v_o$ as the previous values to update the previous values by the current values, and processes of step S11 and subsequent steps are repeated.

Figure 6:
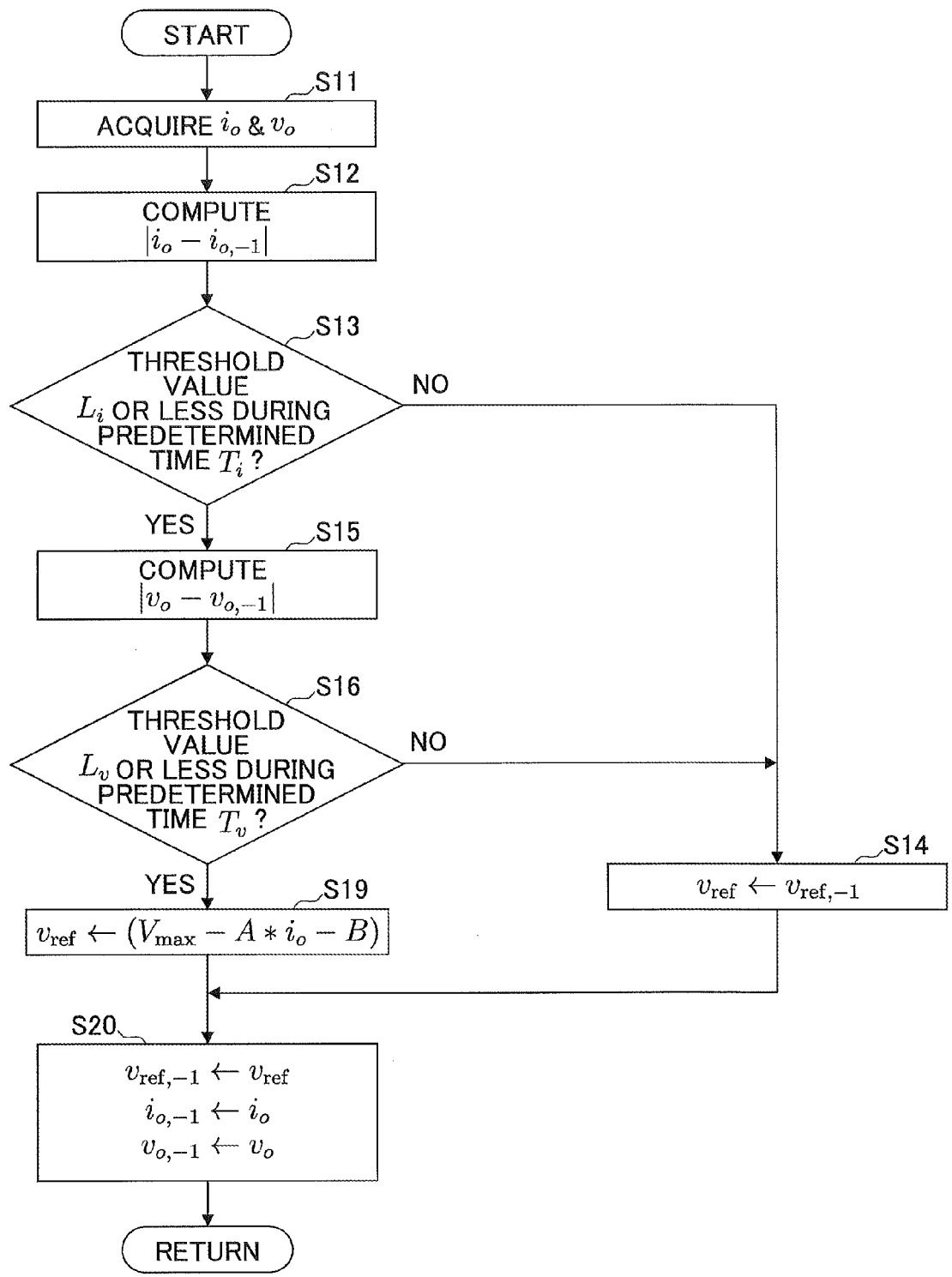
FIG. 6 is a flow chart for explaining an example of the method of setting the output voltage target value.

FIG. 6 is a flow chart for explaining an example of the method of setting the output voltage target value $v_{ref}$ in a case in which $\Delta I_{max} = I_{max}$. In FIG. 6, those steps that are the same as those corresponding step steps in FIG. 5 are designated by the same reference numerals, and a description thereof will be omitted. In FIG. 6, step S17 illustrated in FIG. 5 is omitted. In the case in which $\Delta I_{max}=I_{max}$, the computing time of the output voltage target value $v_{ref}$ can be reduced because the judging process of step S17 can be omitted.

Figure 7:
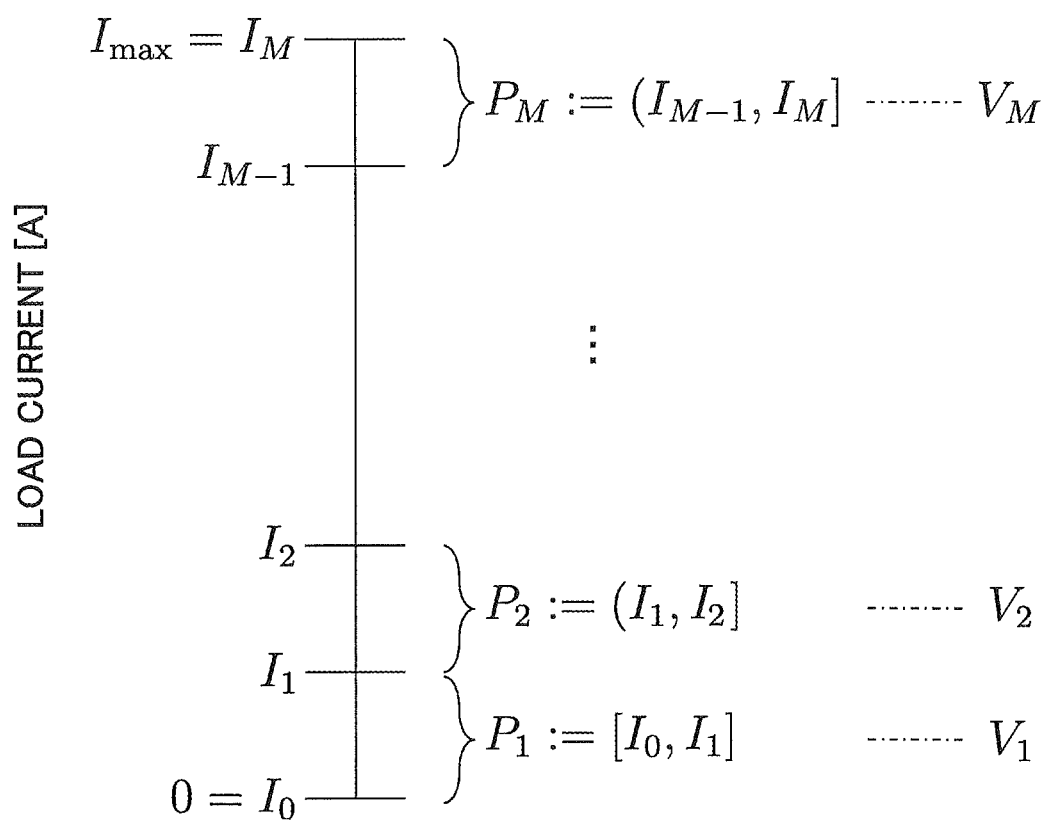
FIG. 7 is a diagram for explaining an example of a method of allocating the output voltage target value to each section of the load current.

FIG. 7 is a diagram for explaining an example of a method of allocating the output voltage target value $v_{ref}$ to each section of the load current I. More particularly, FIG. 7 illustrates an example in which the output voltage target value $v_{ref}$ is selected from a plurality of candidates that are prepared according to the magnitude of the load current I. The load current I is sectioned into a plurality of sections (M sections in the example illustrated in FIG. 7) $P_m$ in advance according to the magnitude of the load current I, and a candidate $V_m$ of the output voltage target value $v_{ref}$ is allocated to each of the sections $P_m$, where m=1, . . . , M. For example, $V_m$ is preferably set to satisfy $V_m>=V_{med}$ and $V_M<=V_{M-1}<=\ldots<=V_2<=V_1$. The target value modifier 23 may select the output voltage target value $v_{ref}$ from the plurality of candidates $V_m$ that are prepared in advance according to the magnitude of the load current value $i_o$, for example, in order to prevent the output voltage target value $v_{ref}$ from constantly continuing to change with respect to a small change in the load current I, and reduce the effects on the accuracy with which the output voltage V is controlled.

The plurality of candidates $V_m$ is preferably computed in advance according to the following formula (4) or (5), and prestored in the memory of the control unit 20.

For example, the formula (4) is used to compute the candidates $V_m$ based on the estimated variation $\Delta V$ of the output voltage V at the time when the load current I suddenly changes in steps, in the case in which a current $I_m$ is the maximum variation $\Delta I_{max}$ or higher (that is, $I_m>=\Delta I_{max}$).

$$V_m=[V_{max}-\{\Delta I_{max}/\sqrt{(2-2 \cos \emptyset)}\}\sqrt{\{(1/2\pi f_c C)^2+r_C^2\}}-B] \qquad (4)$$

On the other hand, the formula (5) is used to compute the candidates $V_m$ based on the estimated variation $\Delta V$ of the output voltage V at the time when the load current I suddenly changes in steps, in the case in which the current $I_m$ is lower than the maximum variation $\Delta I_m$, (that is, $I_m<\Delta I_{max}$).

$$V_m=[V_{max}-\{I_m/\sqrt{(2-2 \cos \emptyset)}\}\sqrt{\{(1/2\pi f_c C)^2+r_C^2\}}-B] \qquad (5)$$

Figure 8:
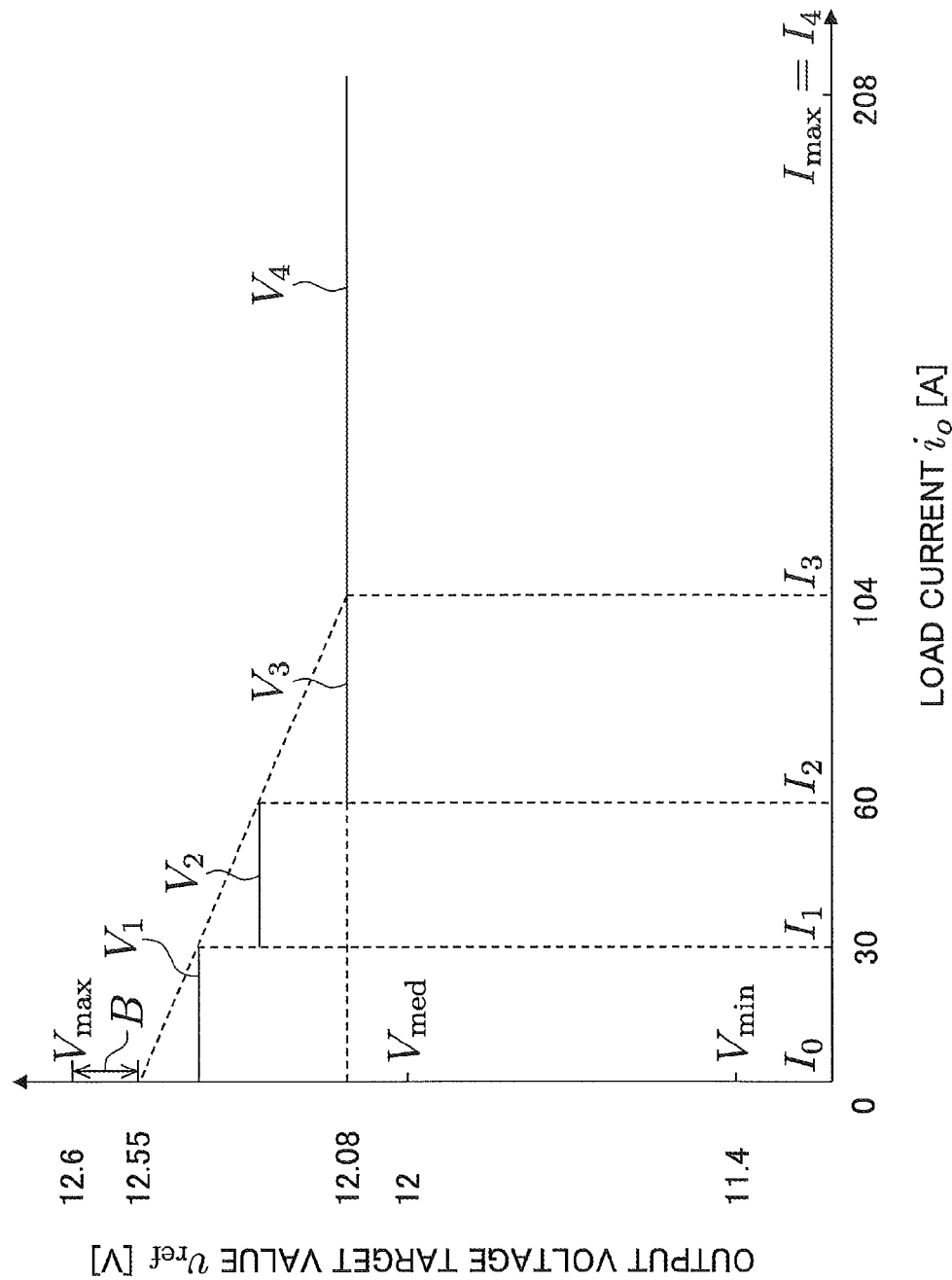
FIG. 8 is a diagram illustrating an example of the relationship between the load current and the output voltage target value.

As illustrated in FIG. 8, the target value modifier 23 reads the candidates $V_m$ corresponding to the magnitude of the acquired load current value $i_o$, and sets the read candidates $V_m$ to the output voltage target value $v_{ref}$. FIG. 8 is a diagram illustrating an example of the relationship between the load current I and the output voltage target value $v_{ref}$. FIG. 8 illustrates a case in which $V_{min}=11$ 0.4 V, $V_{med}=12$ V, $V_{max}=12.6$ V, $\Delta I_{max}=104$ A, $I_{max}=208$ A, C=10800 μF, $r_C=1.8$ mΩ, $f_c=5$ kHz, ø=45°, B=50 mV, $I_{max}=I_4=208$ A, $I_3=104$ A, $I_2=60$ A, $I_1=30$ A, and $I_0=0$.

Figure 9:
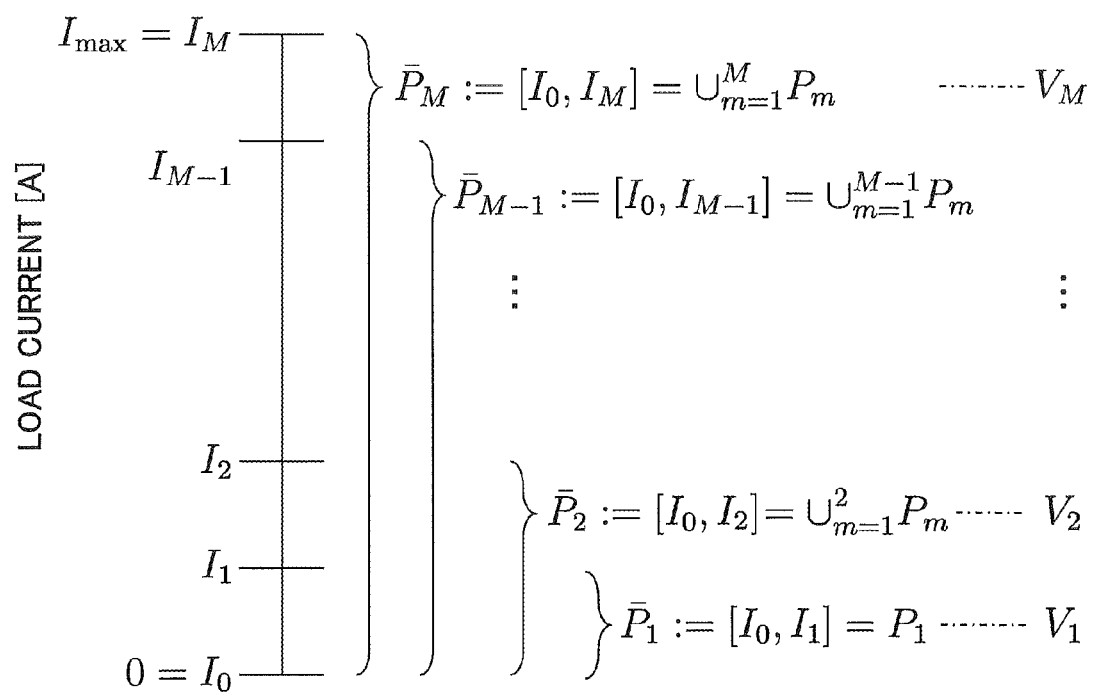
FIG. 9 is a diagram for explaining an example of the method of allocating the output voltage target value to each section of the load current.

FIG. 9 is a diagram for explaining an example of the method of allocating the output voltage target value to each section of the load current. More particularly, FIG. 9 illustrates an example in which the output voltage target value $v_{ref}$ is selected from a plurality of candidates that are prepared according to the magnitude of the load current I. The load current I is sectioned into a plurality of sections (M sections in the example illustrated in FIG. 9) $P_m$ in advance according to the magnitude of the load current I, and a candidate $V_m$ of the output voltage target value $v_{ref}$ is allocated to each of the sections $P_m$, where m=1, . . . , M. A designation "" in the expression "$P_m$" represents an overline affixed to "$P_m$". Lower limit values of each of the M sections $P_m$ of the load current I are all equal to a minimum value $I_0$ of the load current I, and a range of each section $P_m$ increases as the value of m becomes larger.

Figure 10:
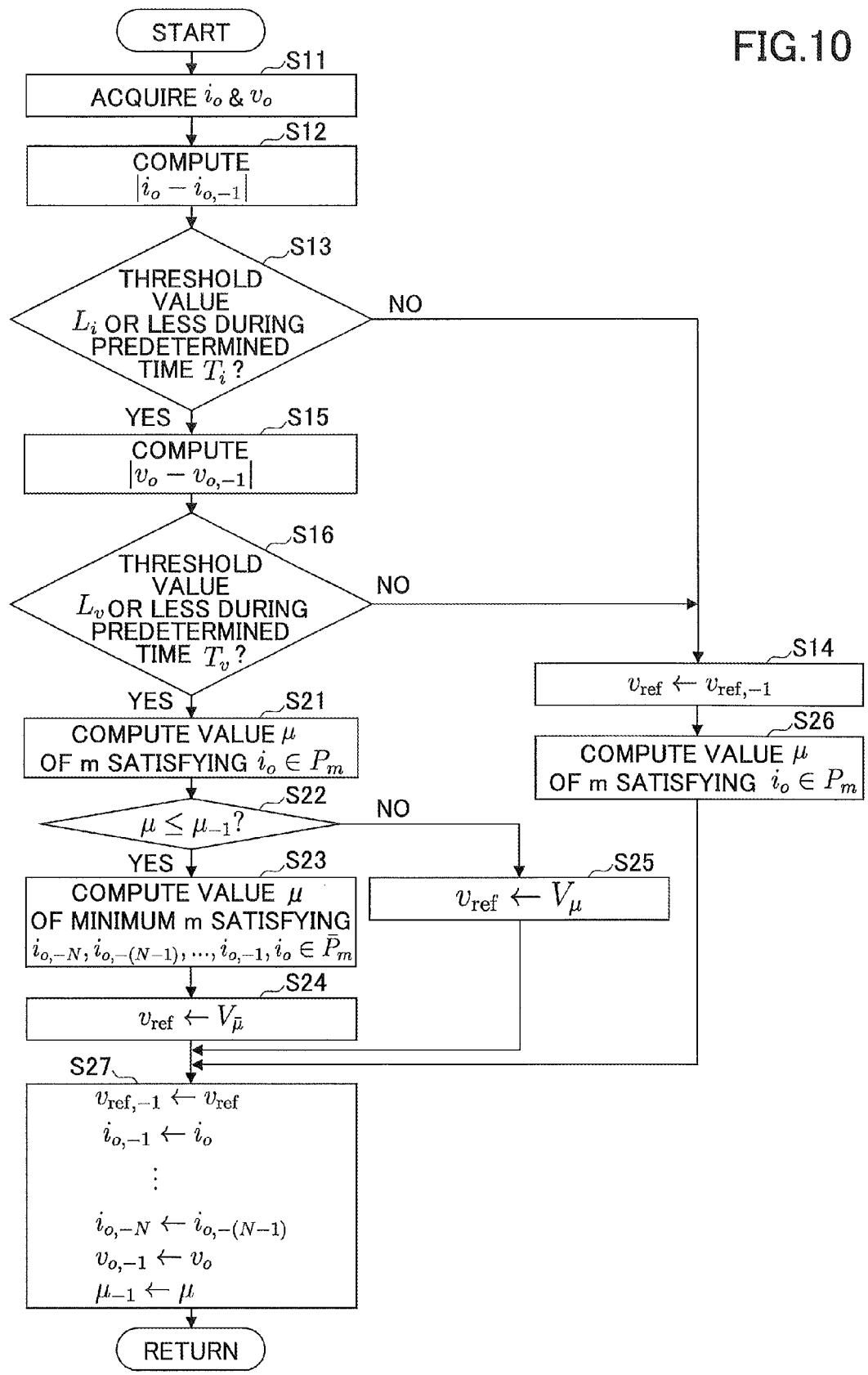
FIG. 10 is a flow chart illustrating an example of the method of setting the output voltage target value.

FIG. 10 is a flow chart illustrating an example of the method of setting the output voltage target value $v_{ref}$. In FIG. 10, those steps that are the same as those corresponding steps in FIG. 5 are designated by the same reference numerals, and a description thereof, including steps S11 through S16, will be omitted. Constants and variables are as follows.

$L_i$, $T_i$: Values (current value and time (number of cycles) used to judge whether the load current is suddenly changing;
$L_v$, $T_v$: Values (current value and time (number of cycles) used to judge whether the load voltage is suddenly changing;
$I_0$, . . . $I_M$: Values for sectioning the load current into sections;
$V_1$, . . . $V_M$: Candidates of the output voltage target value;
$v_{ref,-1}$: Output voltage target value of 1 cycle before;
$i_{o,-1}$: Load current of 1 cycle before;
. . .
$i_{o,-N}$: Load current of N cycles before;
$v_{o,-1}$: Output voltage of 1 cycle before;
. . .
$v_{o,-N}$: Output voltage of N cycles before; and
$\mu_{-1}$: μ of 1 cycle before.

In a case in which the value of m, of the section $P_m$ including the current load current value $i_o$, is set to μ, the target value modifier 23 computes μ in steps S21 and S26. In step S22, the target value modifier 23 judges whether μ is $\mu_{-1}$ or less, that is, the previous value of μ or less, in order to detect whether the load current I has increased or decreased. The target value modifier 23 judges that the load current I has increased in a case in which μ is greater than $\mu_{-1}$ and judges that the load current I has decreased in a case in which μ is $\mu_{-1}$ or less.

In the case in which μ is greater than $\mu_{-1}$ and the judgment result in step S22 is No, the target value modifier 23, in step S25, modifies the output voltage target value $v_{ref}$ to the candidate $V_\mu$ (that is, $V_m$ at the time when m=μ) that is computed according to the formula (4) or (5).

On the other hand, in the case in which μ is $\mu_{-1}$ or less and the judgment result in step S22 is Yes, the target value modifier 23, in step S23, computes μ. A designation "" in the expression "μ" represents an overline affixed to "μ". μ indicates the value of m in a narrowest section amongst the sections $P_m$ including the N+1 load current values $i_o$ from the current cycle to N cycles before. In the case in which μ is $\mu_{-1}$ or less, the target value modifier 23, in step S24, modifies the output voltage target value $v_{ref}$ to the candidate $V_\mu$ (that is, $V_m$ at the time when m=μ) that is computed according to the formula (4) or (5).

In other words, in the case in which the increase of the load current I is detected by performing the processes of steps S22 and S25, the target value modifier 23 can quickly decrease the output voltage target value $v_{ref}$. On the other hand, in the case in which the decrease of the load current I is detected by performing the processes of steps S22, S23, S24, the target value modifier 23 can increase the output voltage target value $v_{ref}$ after the state in which the load current I decreases by the predetermined current value or less continues for a predetermined time or longer. In other words, even when the decrease of the load current I is detected, it is possible to take measures so that the output voltage target value $v_{ref}$ uneasily increases. Consequently, when the value of the load current I is relatively value, it is possible to prevent the output voltage target value $v_{ref}$ from being continuously set to a high value.

In step S27, the target value modifier 23 rewrites the current values of the output voltage target value $v_{ref}$, the N load current values $i_o$ from the current cycle to N−1 cycles before, the output voltage value $v_o$, and μ as the previous values to update the previous values by the current values, and processes of step S11 and subsequent steps are repeated.

Accordingly, by modifying the output voltage target value $v_{ref}$ based on the estimated value of the variation ΔV at the time of the sudden change in the load current I, the output voltage V can be controlled to a value that is as high as possible but is within the range that does not exceed the upper limit value $V_{max}$ even when a sudden decrease occurs in the load current I.

In addition, by selecting the output voltage target value $v_{ref}$ from amongst the plurality of candidates $V_m$ that are prepared according to the magnitude of the load current I, it is possible to avoid a situation in which the output voltage target value $v_{ref}$ constantly continues to change with respect to the change in the load current I.

Moreover, because the output voltage target value $v_{ref}$ is not modified during the interval in which the load current I or the output voltage V changes at the rate greater than or equal to the predetermined change rate, it is possible to avoid a change in the output voltage target value $v_{ref}$ at the time when the sudden change occurs in the load current I or the output voltage V. Further, it is possible to suppress undesirable effects of the change in the output voltage target value $v_{ref}$ on the control of the output voltage V.

In addition, the output voltage target value $v_{ref}$ is decreased in the case in which the increase in the load current I is detected, and the output voltage target value $v_{ref}$ is increased after the state in which the load current I decreases continues for the predetermined time or longer in the case in which the decrease in the load current I is detected. Hence, it is possible to modify the output voltage target value $v_{ref}$ in a direction such that the output V uneasily exceeds the upper limit value $V_{max}$.

According to this embodiment, it is possible to simultaneously set the output voltage V to a value that is as high as possible, and control the output voltage V to fall within the predetermined range even when the load current I suddenly decreases, and thus, the high efficiency of the converter circuit 30 can be achieved.

Figure 11:
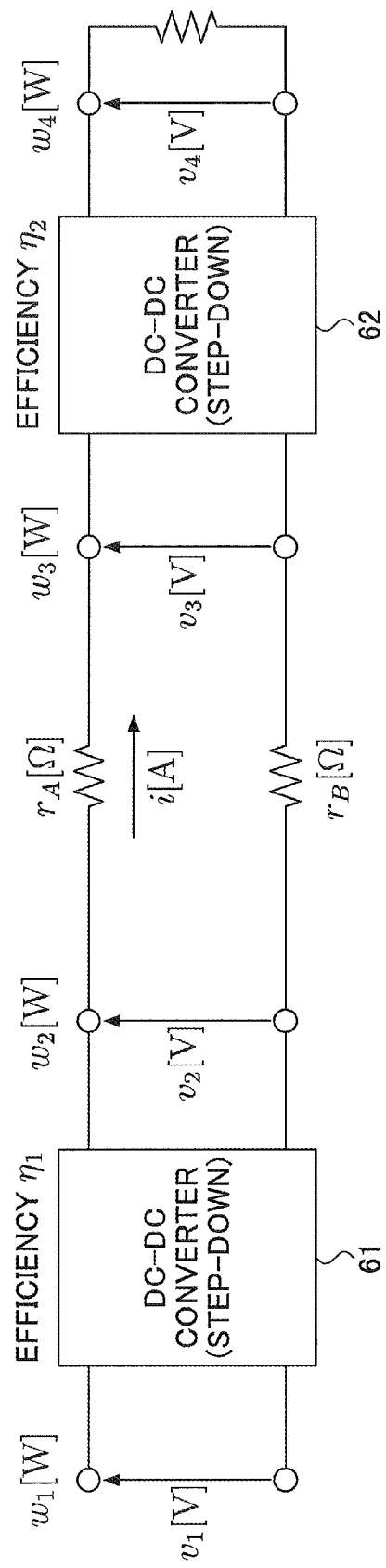
FIG. 11 is a structural diagram illustrating an example of two DC-DC converters connected in series.

Therefore, the efficiency of the entire server 2 can be improved by the improved efficiency of the converter circuit 30. For example, a consideration will be given of a case in which the server 2 is provided with a converter 61, and a converter 62 that is connected in series to the converter 61, as illustrated in FIG. 11. FIG. 11 is a structural diagram illustrating an example of two DC-DC converters connected in series. In this case, each of the converters 61 and 62 is a step-down DC-DC converter that performs a step-down conversion on an input DC voltage and outputs an output DC voltage. For example, the converter 61 corresponds to the DC-DC converter 6 that is provided at an output part of the switching power supply apparatus 3, and the converter 62 corresponds to a converter that is provided at an input part of the load 7.

In FIG. 11, an output power $w_4$ of the converter 62 can be computed from the following set of formulas (6) to (8), using the known definition of efficiency.

$$w_2 = \eta_1 w_1 \quad (6)$$
$$i = w_2/v_2 = \eta_1 w_1/v_2$$
$$v_3 = v_2 - (r_A + r_B)i$$
$$= v_2 - (r_A + r_B)(\eta_1 w_1/v_2)$$

-continued $$w_3 = iv_3 \quad (7)$$
$$= i\{v_2 - (r_A + r_B)(\eta_1 w_1/v_2)\}$$
$$= (\eta_1 w_1/v_2)\{v_2 - (r_A + r_B)(\eta_1 w_1/v_2)\}$$
$$= \eta_1 w_1 - (r_A + r_B)(\eta_1^2 w_1^2/v_2^2)$$

$$w_4 = \eta_2 w_3 \quad (8)$$
$$= \eta_1 \eta_2 w_1 - \eta_1 \eta_2 (r_A + r_B)(\eta_1 w_1^2/v_2^2)$$

Figure 12:
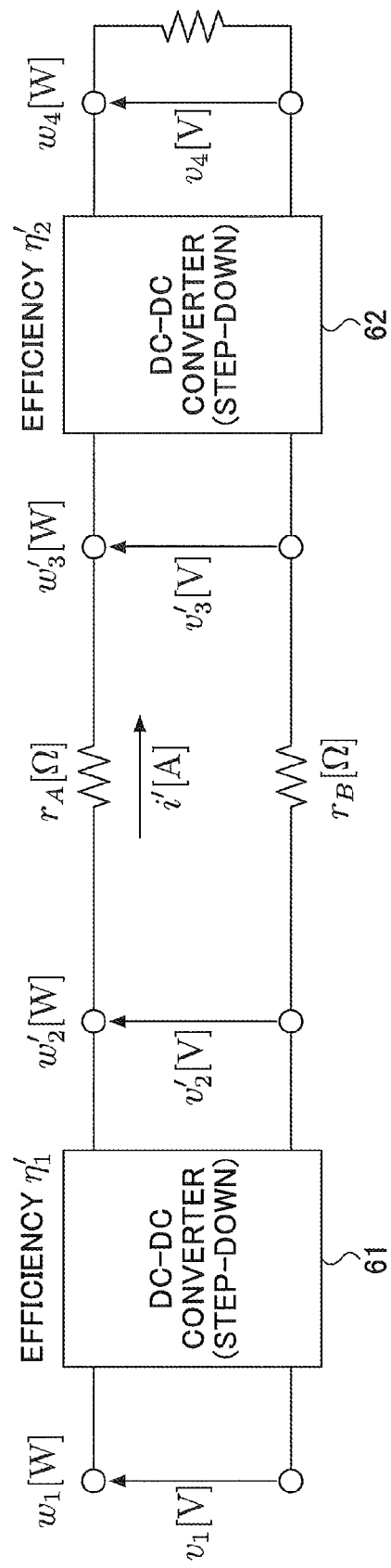
FIG. 12 is a structural diagram illustrating an example of the two DC-DC converters connected in series.

FIG. 12 is a structural diagram illustrating an example of the two DC-DC converters connected in series. In FIG. 12, suppose that when the output voltage $v_2$ of the converter 61 is increased to v2', the efficiency $\eta_1$ of the converter 61 improves to $\eta_1$', and the efficiency $\eta_2$ of the converter 62 improves to $\eta_2$'. In this case, the following formula (9) stands.

$$w_4' = \eta_1'\eta_2'w_1 - \eta_1'\eta_2'(r_A+r_B)(\eta_1'w_1^2/v_2'^2) \quad (9)$$

Then, for simplicity, a case in which "a product of the efficiencies does not change", as represented by the following formula (10), is considered.

$$\eta_1\eta_2 = \eta_1'\eta_2' \quad (10)$$

In this case, the following formula (11) stands, and the following formula (12) can be derived from the formula (11).

$$w_4' = \eta_1\eta_2 w_1 - \eta_1\eta_2(r_A+r_B)(\eta_1'w_1^2/v_2'^2) \quad (11)$$

$$w_4' - w_4 = \eta_1\eta_2(r_A+r_B)w_1^2\{(\eta_1/v_2^2) - (\eta_1'/v_2'^2)\} \quad (12)$$

More particularly, the following relationship (13) stands when $\eta_1=0.98$ and $\eta_1'=0.981$ by setting $v_2$ and $v_2'$ to $v_2=12$ and $v_2'=12.1$.

$$(\eta_1/v_2^2) - (\eta_1'/v_2'^2) > 0 \quad (13)$$

As a result, the following relationship (14) can be derived. The following relationship (14) indicates that, even when the efficiency $\eta_1$ of the comparator 61 is improved by increasing the output voltage $v_2$ of the comparator 61 and increased the output voltage $v_2$ of the comparator 61 is subjected to the step-down conversion, it is possible to improve the efficiency of the entire combination of the converters 61 and 62.

$$w_4' - w_4 > 0 \quad (14)$$

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A control device comprising:
   a processor that executes a process including
      generating a driving signal that drives a switching device, so that an output voltage of a converter circuit that performs a step-down conversion on input power by driving the switching device matches a target value; and modifying the target value so that as an output current of the converter circuit becomes lower the output voltage becomes closer to an upper limit value of the output voltage, wherein the modifying modifies the target value based on an estimated variation of the output voltage at a time when the output current suddenly decreases.

2. The control device according to claim 1, wherein the modifying increases the target value as the output current becomes lower.

3. The control device according to claim 1, wherein the modifying increases the target value by a voltage value higher than a center value between the upper limit value and a lower limit value of the output voltage.

4. The control device according to claim 1, wherein the modifying modifies the target value so that the output voltage does not exceed the upper limit value when the output current decreases.

5. The control device according to claim 4, wherein the modifying modifies the target value so that a difference between the upper limit value and the output voltage becomes greater than or equal to a predetermined voltage difference.

6. The control device according to claim 4, wherein the modifying sets the target value so that the output voltage does not become closer to the upper limit value due to the driving signal as the output current becomes lower, when the output current exceeds a predetermined current threshold value.

7. The control device according to claim 6, wherein the modifying fixes the target value to a predetermined value when the output current exceeds the predetermined current threshold value.

8. The control device according to claim 6, wherein the predetermined current threshold value is a maximum variation of the output current.

9. The control device according to claim 1, wherein the modifying selects the target value from a plurality of candidates that are prepared according to a magnitude of the output current.

10. A control device comprising:
a processor that executes a process including
generating a driving signal that drives a switching device, so that an output voltage of a converter circuit that performs a step-down conversion on input power by driving the switching device matches a target value; and
modifying the target value so that as an output current of the converter circuit becomes lower the output voltage becomes closer to an upper limit value of the output voltage,
wherein the modifying does not modify the target value during an interval in which output current or the output voltage changes at a rate greater than or equal to a predetermined change rate.

11. A control device comprising:
a processor that executes a process including
generating a driving signal that drives a switching device, so that an output voltage of a converter circuit that performs a step-down conversion on input power by driving the switching device matches a target value; and
modifying the target value so that as an output current of the converter circuit becomes lower the output voltage becomes closer to an upper limit value of the output voltage, wherein the modifying, when an increase of the output current is detected, decreases the target value, and when a decrease of the output current is detected, increases the target value after a state in which the output current decreases continues for a predetermined time or longer.

12. A DC-DC converter comprising:
a converter circuit including a switching device to which input power is input, and an inductor through which a current flows by driving the switching device; and
a processor that executes a process including
generating a driving signal that drives the switching device, so that an output voltage of the converter circuit that performs a step-down conversion on the input power by driving the switching device matches a target value; and
modifying the target value so that as an output current of the converter circuit becomes lower the output voltage becomes closer to an upper limit value of the output voltage,
wherein the modifying modifies the target value based on an estimated variation of the output voltage at a time when the output current suddenly decreases.

13. A switching power supply apparatus comprising:
an AC-DC converter that converts AC power to output DC power;
a converter circuit including a switching device to which the DC power output from the AC-DC converter is input, and an inductor through which a current flows by driving the switching device; and
a processor that executes a process including
generating a driving signal that drives the switching device, so that an output voltage of the converter circuit that performs a step-down conversion on the DC power by driving the switching device matches a target value; and
modifying the target value so that as an output current of the converter circuit becomes lower the output voltage becomes closer to an upper limit value of the output voltage,
wherein the modifying modifies the target value based on an estimated variation of the output voltage at a time when the output current suddenly decreases.

14. An information processing apparatus comprising:
a processor that executes a process including
generating a driving signal that drives a switching device, so that an output voltage of a converter circuit that performs a step-down conversion on input power by driving the switching device matches a target value; and
modifying the target value so that as an output current of the converter circuit becomes lower the output voltage becomes closer to an upper limit value of the output voltage; and
a load supplied with the output voltage,
wherein the modifying modifies the target value based on an estimated variation of the output voltage at a time when the output current suddenly decreases.

15. The information processing apparatus according to claim 14, wherein the load includes a converter that performs a step-down conversion on the output voltage and outputs DC power.

* * * * *